US012699201B2

(12) United States Patent
Vern

(10) Patent No.: US 12,699,201 B2
(45) Date of Patent: Aug. 4, 2026

(54) AUDIO RENDERING OF AN ELECTROMAGNETIC METAL DETECTION SIGNAL

(71) Applicant: SARL XPLORER, Castanet-Tolosan (FR)

(72) Inventor: Jean-Louis Vern, Perols (FR)

(73) Assignee: SARL XPLORER, Castanet-Tolosan (FR)

( * ) Notice: Subject to any disclaimer, the term of this patent is extended or adjusted under 35 U.S.C. 154(b) by 529 days.

(21) Appl. No.: 17/977,984

(22) Filed: Oct. 31, 2022

(65) Prior Publication Data

US 2023/0161067 A1 May 25, 2023

(30) Foreign Application Priority Data

Nov. 1, 2021 (FR) ........................................ 2111596

(51) Int. Cl.
*G01V 3/165* (2006.01)
*G01V 3/10* (2006.01)
*G08B 3/10* (2006.01)

(52) U.S. Cl.
CPC .............. *G01V 3/165* (2013.01); *G08B 3/10* (2013.01); *G01V 3/104* (2013.01)

(58) Field of Classification Search
CPC ........ G01V 3/165; G01V 3/104; G01V 3/101; G08B 3/10; H03G 3/3052; H04R 3/00; H04R 2430/00
See application file for complete search history.

(56) References Cited

U.S. PATENT DOCUMENTS

| | | | | |
|---|---|---|---|---|
| 6,072,885 A * | 6/2000 | Stockham, Jr. | ...... | H04R 25/356 |
| | | | | 381/320 |
| 2006/0092022 A1* | 5/2006 | Cehelnik | ................. | G06F 3/011 |
| | | | | 340/561 |
| 2011/0298620 A1* | 12/2011 | Zimmermann | .......... | A61B 7/00 |
| | | | | 340/573.1 |

(Continued)

FOREIGN PATENT DOCUMENTS

| | | |
|---|---|---|
| DE | 42 12 363 | 10/1993 |
| DE | 298 11 404 | 9/1998 |

(Continued)

OTHER PUBLICATIONS

"Deus V5—User's Manual" for a metal detector; cover sheet + pp. 1-49 (Year: 2018).*

(Continued)

*Primary Examiner* — Michael N Opsasnick
(74) *Attorney, Agent, or Firm* — IPSILON USA, LLP

(57) ABSTRACT

A method includes compressing the dynamic range of the target detection signal so as to correspond to the desired dynamic range (60) of the audio signal (81) that is generated in order to acoustically render this detection signal to the user, so that the quietest signals are audible, the loudest signals do not cause hearing damage for the user, and that the sound volume is able to be perceived gradually for the intermediate-level signals. This avoids losing variations in the detection signal that are below the audibility threshold (63) and clipping them above a maximum hearing comfort threshold (64) in the corresponding audio signal (71) that would be generated according to the prior art.

13 Claims, 6 Drawing Sheets

(56)                    References Cited

U.S. PATENT DOCUMENTS

| 2013/0147487 A1* | 6/2013 | Harmer | G01V 3/30 |
| | | | 324/329 |
| 2013/0234716 A1* | 9/2013 | Candy | G01V 3/10 |
| | | | 324/326 |
| 2021/0006902 A1* | 1/2021 | Ohshita | H04R 3/00 |

FOREIGN PATENT DOCUMENTS

| DE | 10 2005 018590 | 12/2006 |
| WO | 00/15001 | 3/2000 |

OTHER PUBLICATIONS

"DEUS vs—User Is Manual", 4 juillet 2018 (Jul. 4, 2018), XP55936228, Extrait de l'Internet: URL:https://smhttp-ssl-37061.nexcesscdn.net/media/_docs/Manual/EN/XP_DEUS_S_Manual_E N.pdf [extrait le Jun. 28, 2022].
Anonymous: Omega 8500 Metal Detector—Owner I s Manual II , 1 janvier 2015 (Jan. 1, 2015), XP055936200, Extrait de l'Internet: URL:https://smhttp-ssl-37061.nexcesscdn.ne t/media/_docs/Manual/EN/Teknetics_Omega850 0_Manual_EN.pdf [extrait le Jun. 28, 2022].
Harry Neuteboom et al: "A DSP-Based Hearing Instrument IC" , IEEE Journal of Solid-State Circuits, IEEE, USA, vol. 32, No. 11, Nov. 1, 1997 (Nov. 1, 1997).
International Search Report dated Jun. 28, 2022.

* cited by examiner

[Fig. 1]
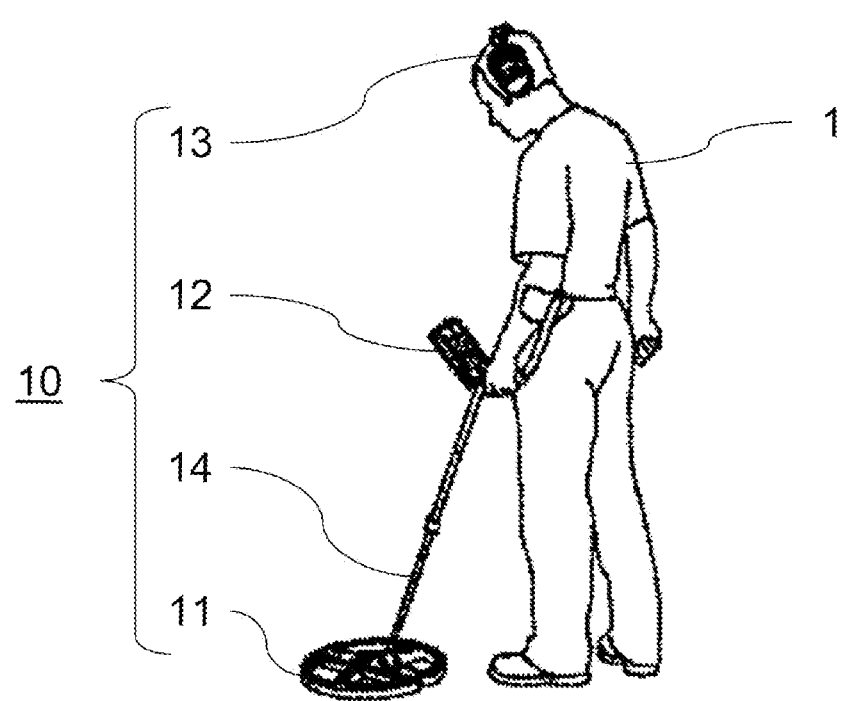

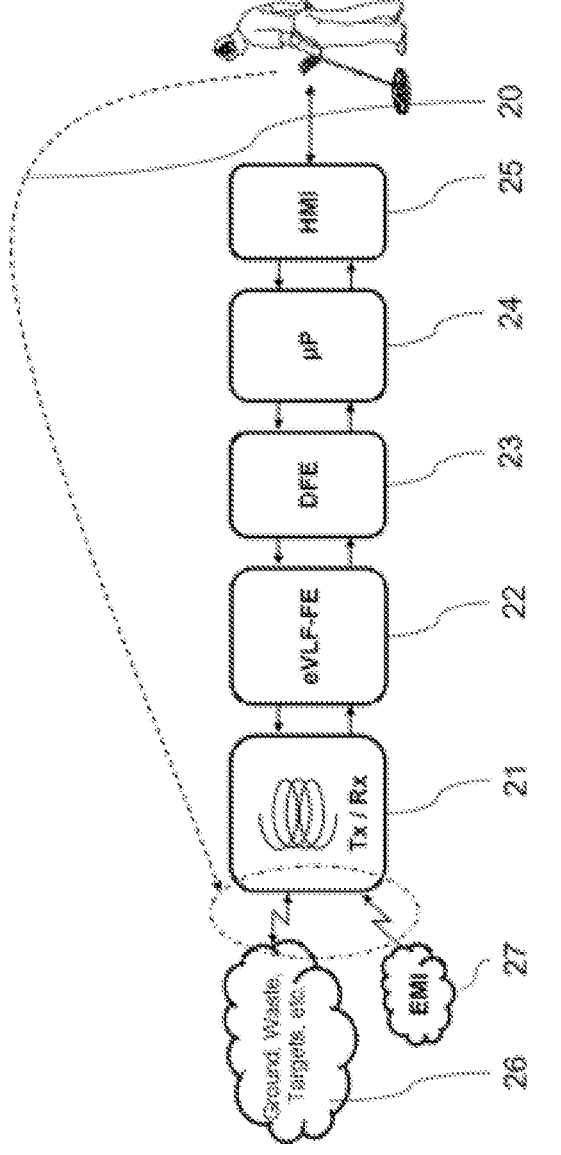
[Fig. 2]

[Fig. 3]
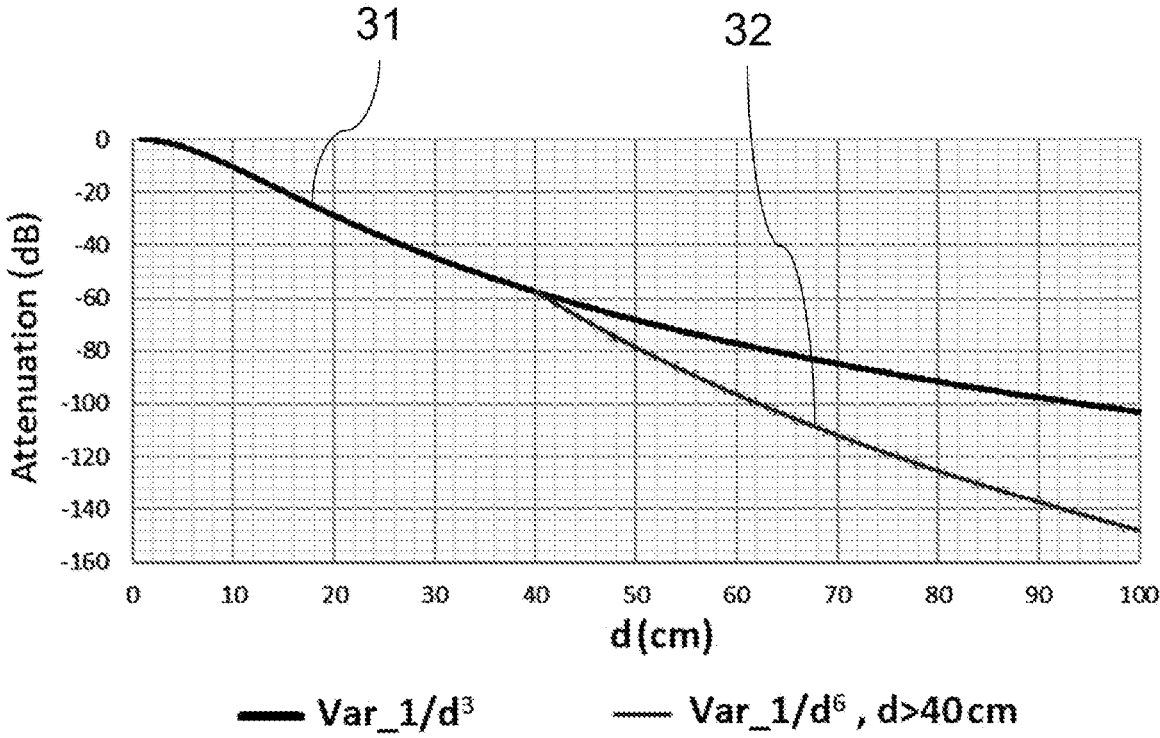
31
32
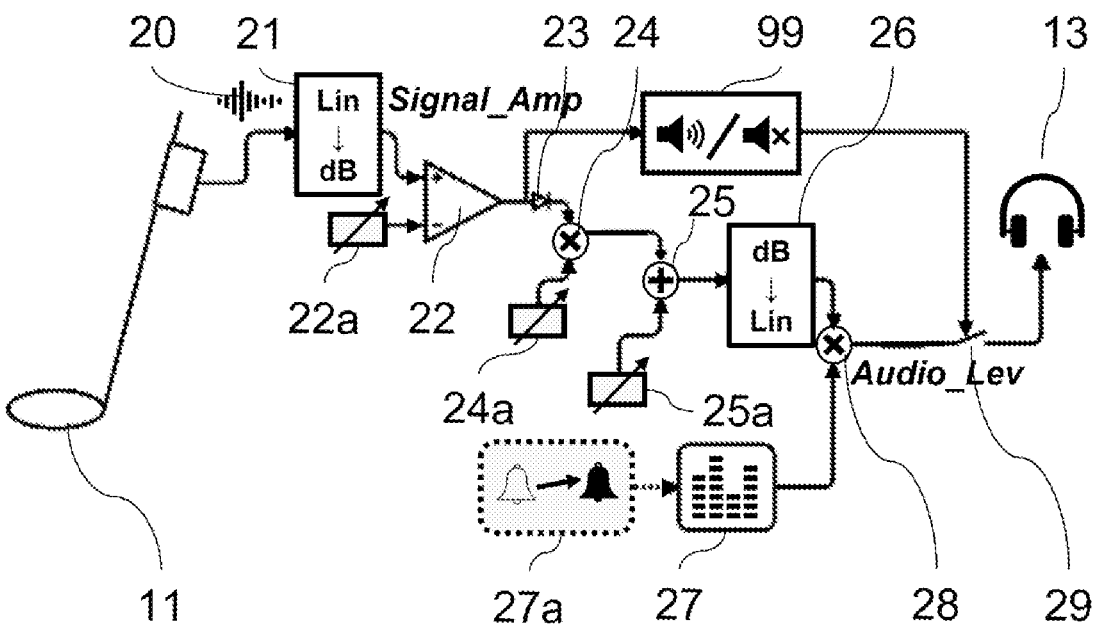
[Fig. 4]

[Fig. 5]
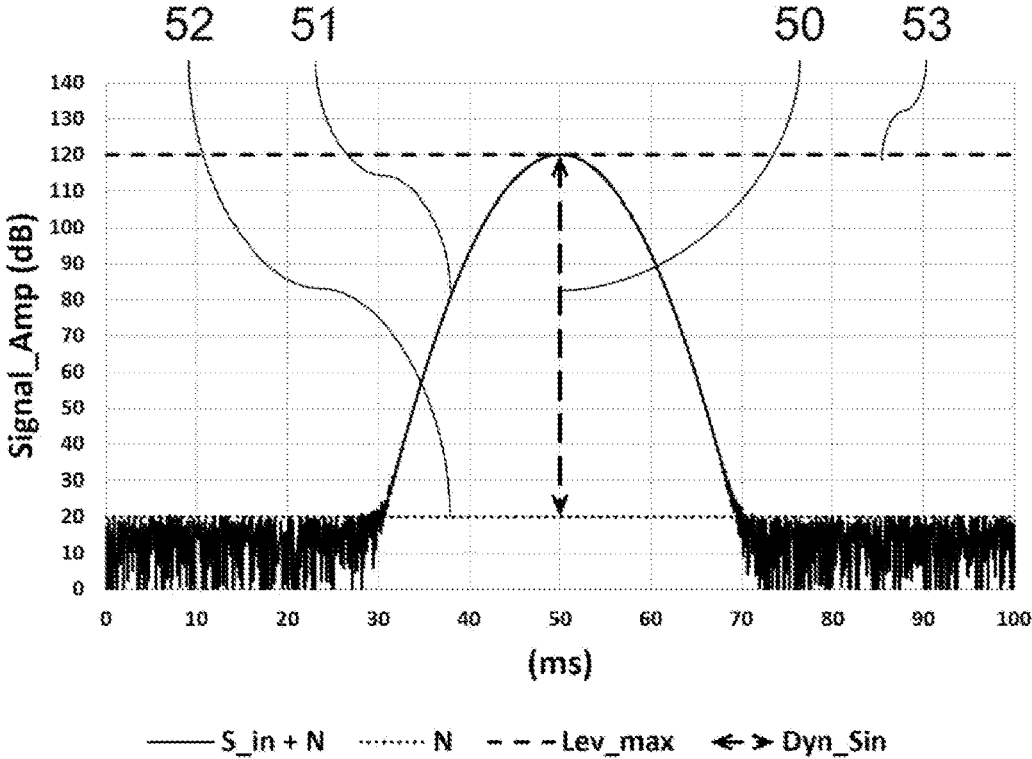
[Fig. 6]
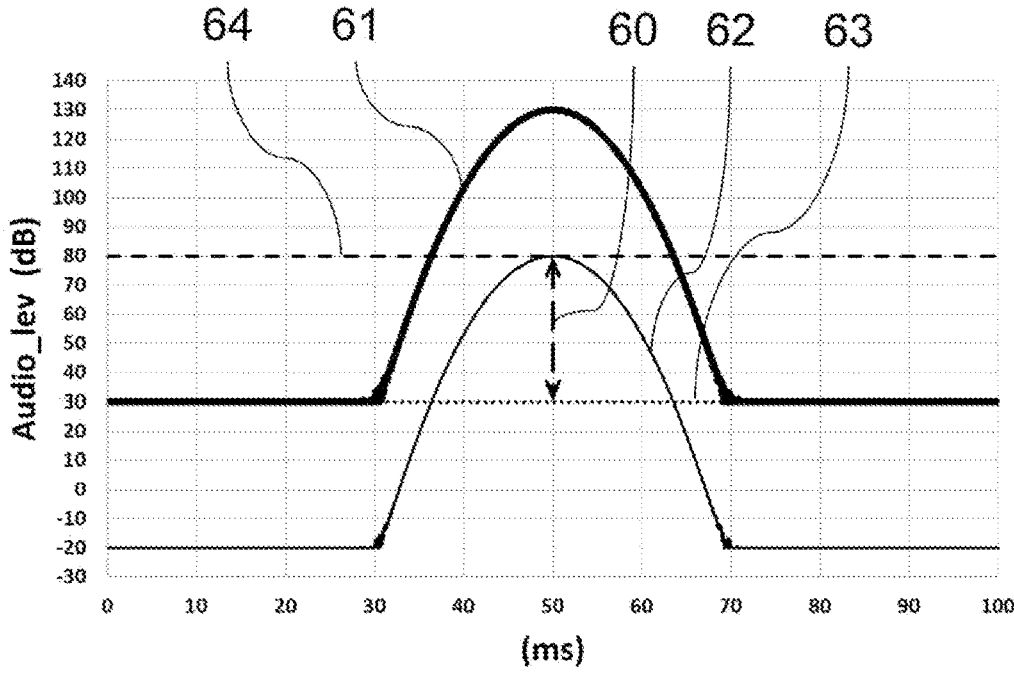

[Fig. 7]
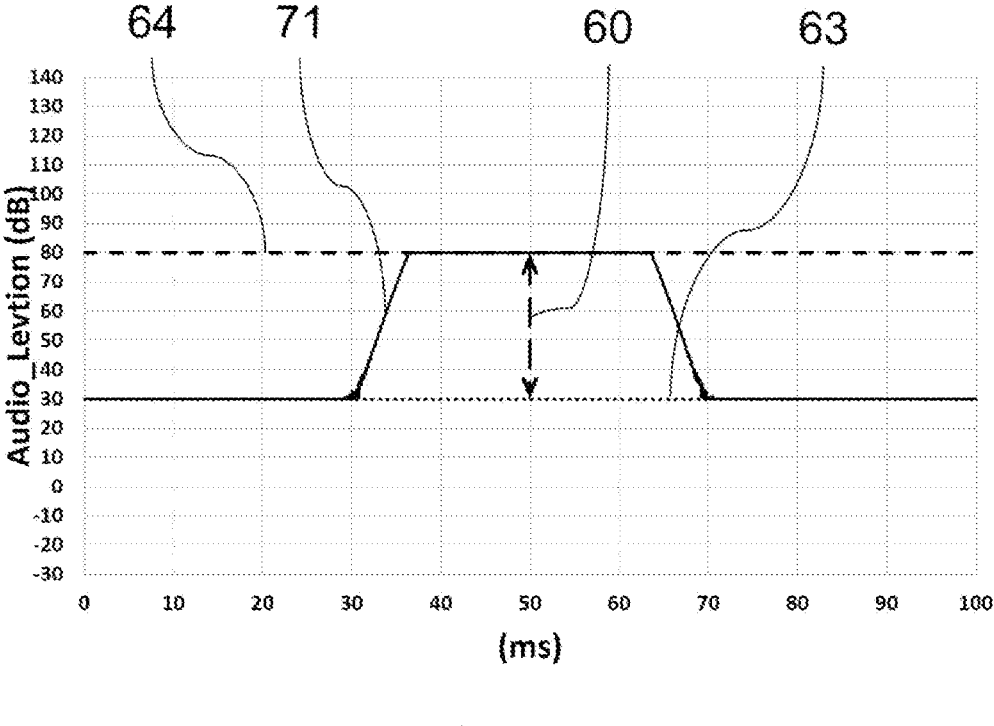
[Fig. 8]
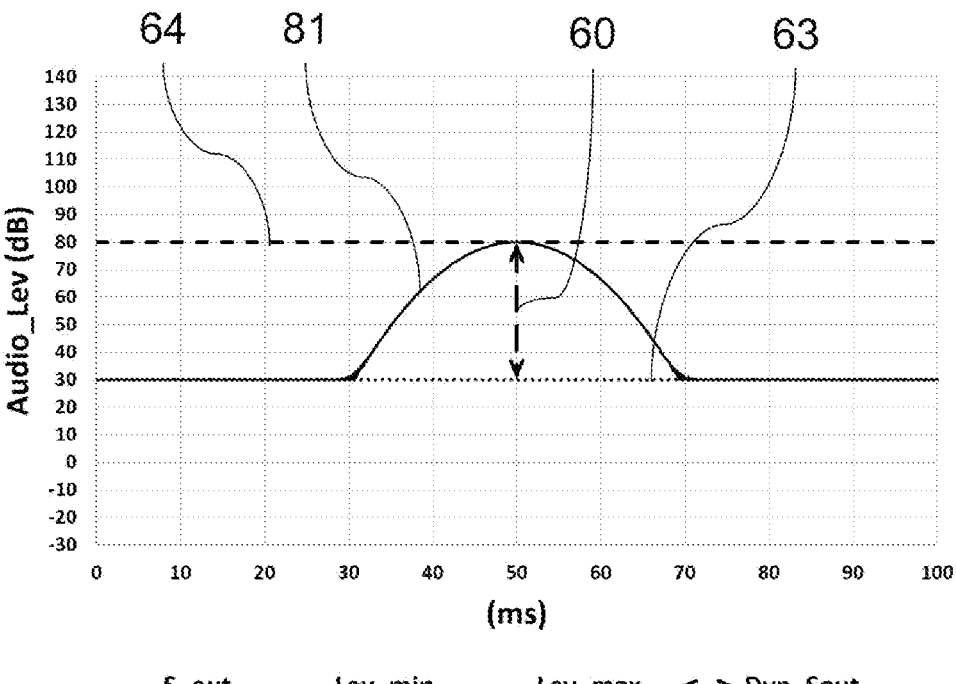

[Fig. 9]
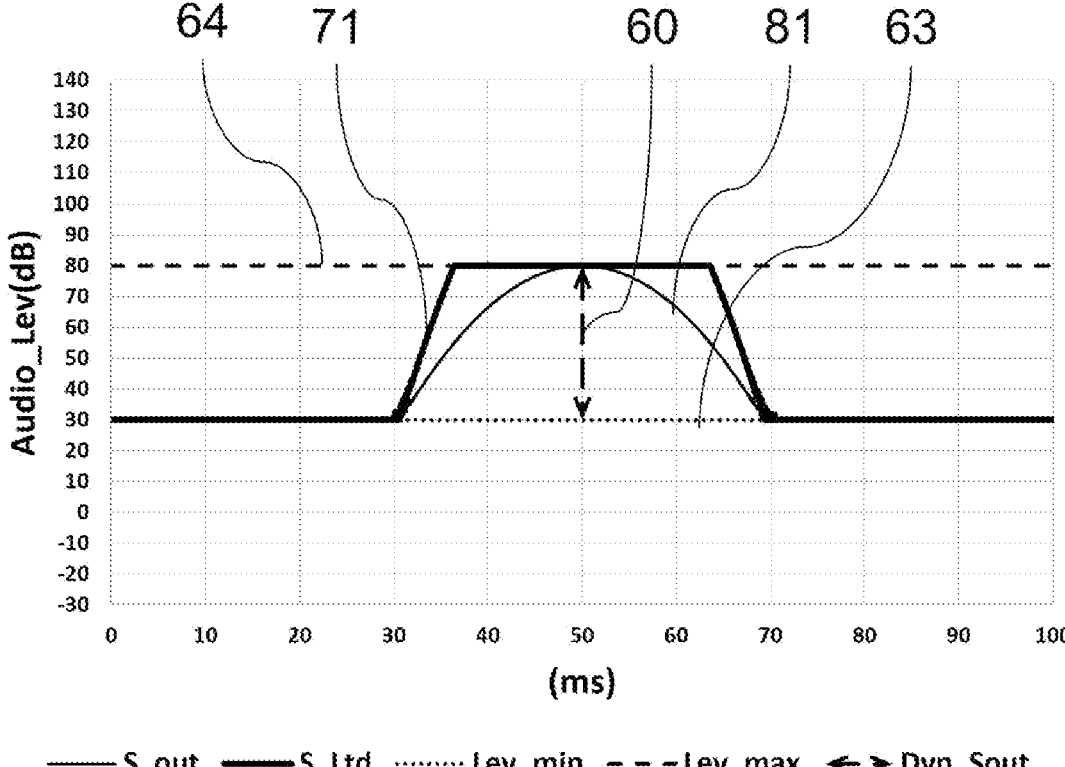
[Fig. 10]
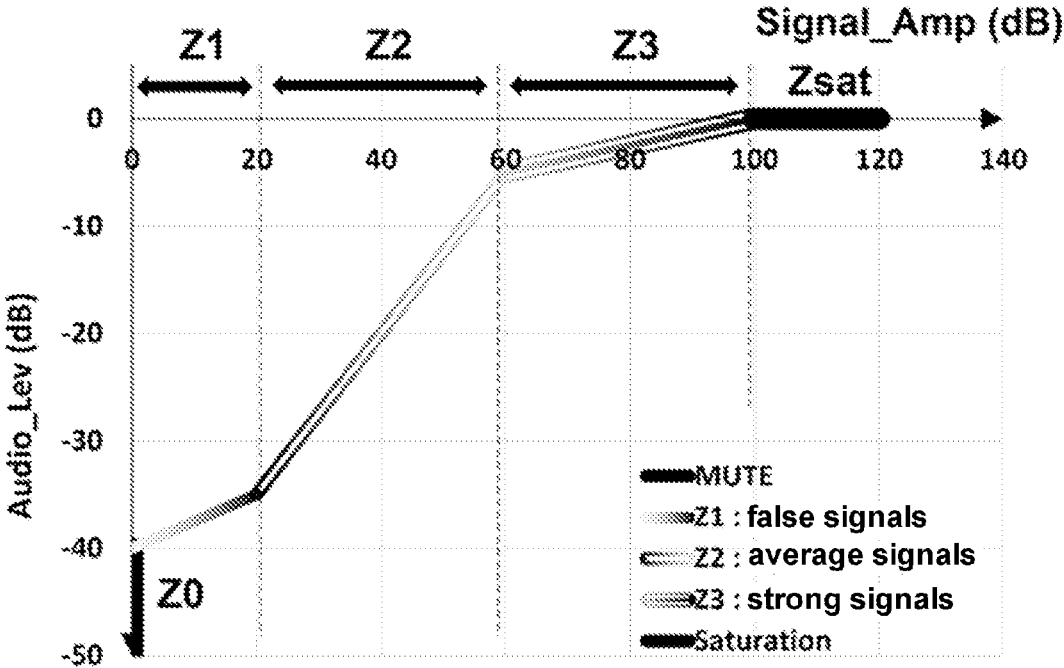

AUDIO RENDERING OF AN ELECTROMAGNETIC METAL DETECTION SIGNAL

RELATED APPLICATION

This application claims the benefit of priority from French Patent application Ser. No. 17/977,984, filed on Nov. 1, 2021, the entirety of which is incorporated by reference.

FIELD OF THE INVENTION

The present invention relates in general to the field of metal detection using portable electromagnetic detectors, and more particularly to the audio rendering of an electromagnetic metal detection signal.

Such metal detectors are used essentially for leisure purposes, for example to search for and discriminate metal objects buried in the ground such as coins, jewellery, treasure or gold nuggets, but also by professionals, for example for minesweeping, ballistic research, or even searching for pipes in the building industry or polluting metal particles in the food sector. These exemplary applications are not limiting. Modern portable metal detectors allow the user not only to find but also to identify a target buried in the ground.

TECHNOLOGICAL BACKGROUND

Usually, metal detectors comprise an electromagnetic detection head, or more simply detection head or detection disc, which forms the active part of the detector, and which is mounted at the end of a handling shaft. This detection head adopts the shape of a disc since it comprises one or more inductive coils that make it possible to generate an incident electromagnetic field, and to receive a resulting magnetic field modified by the immediate surroundings.

The detection head may also house control electronics, designed to produce an alternating electromagnetic signal at the origin of the incident electromagnetic field, and to process a received electromagnetic detection signal corresponding to the resulting magnetic field. This processing makes it possible to detect and to discriminate any metal objects exposed to the incident electromagnetic field. As a variant, the detection head houses only some of the electronics for exploiting the received electromagnetic detection signal, for example a preamplifier, the rest of these electronics being arranged remotely in a control housing to which the detection head is connected.

In portable electromagnetic detectors operating in continuous-wave mode, also called continuous-wave (or CW) detectors, an alternating magnetic field is emitted "continuously" and the detection is based on variations in amplitude and in phase between the frequency components of the emitted signal and those of the received signal. More specifically, CW detectors use the measurement of the amplitude and phase of the various components of the alternating electromagnetic signal emitted by at least one emitter coil supplied with a voltage, and the components of the electromagnetic signal received by one or more receiver coils arranged close to the emitter coil. The frequency of the signal emitted by the emitter coil is generally less than 100 kHz. In some implementations, the emitter coil and the one or more receiver coils are just one and the same coil.

Implementing the induction balance (or IB) principle makes it possible to inductively measure very slight changes in the properties of the environment. The implementation is achieved by arranging the emission and reception coils such that the mutual inductance of the one or more reception coils and of the one or more emission coils is as low as possible. This makes it possible to minimize the electromagnetic field measured in the absence of a target. The coupling of the two coils is then such that, in fact, the signal received by the receiver coil is substantially zero when no metal element is placed in the field of the emitter coil. This makes it possible to optimize the dynamic range of the measurement signal by measuring only variations in the resulting electromagnetic field.

The most common configuration is the "double D" head, but other configurations are possible, for example with concentric coils, or by placing the coils at 90° to one another, or even with auxiliary coils used to generate a compensation field, or else with yet other geometries.

There are also other types of metal detector that, rather than operating in the "frequency" domain, operate in the "time" domain. In this case, it is not the amplitudes and the relative phases between the frequency components of the emitted signal and of the received signal that are analysed, but rather the shape of the received signal. This may seem similar as there is a correspondence (when using Fourier transforms) between the time domain and the frequency domain, but this generally additionally covers a different way of generating the emitted magnetic field. Specifically, whereas, in the case of a CW detector, the signal is emitted continuously, in the case of a detector in pulsed induction (or "PI", for "pulsed impulsion") mode, a pulsed signal is generated for a few tens of microseconds (µs) in the detection head, and then the signal received following this magnetic excitation of the ambient environment is received and analysed. The same coil may then be used alternately to generate a pulse and to analyse the received field. However, it is also possible to use two coils, specifically one for emission and the other for reception in various configurations (for example the abovementioned "double D" configuration, or others). In any case, the received signal may be seen as the sum of various exponential decreases that are representative of the operating environment. Signals associated with earth or with saltwater exhibit exponential decreases that are generally rapid, with time constants shorter than a few µs, while targets of interest have longer time constants. Of course, the excitation signal has to be renewed periodically (generally with a recurrence of around 1 kHz), and the received signal is "averaged" in order to be utilized, but the processing takes place in the time domain and not in the frequency domain.

It is also possible to have detectors that operate simultaneously in both modes, specifically CW mode and PI mode.

During a detection session, the user roams over a determined area to be explored while sweeping the ground with the portable detector, by way of the handling shaft, thereby avoiding him having to bend down or lean over. More specifically, he stands up and moves the detection disc parallel to the ground using the shaft, while sweeping the detection head from left to right, and then right to left, and so on. The emission coil produces a magnetic field that, with respect to any metal target that is fixed, varies over time due to the fact that the detection head is thus moving. This magnetic field generates eddy currents in the metal target that it is desired to detect.

These currents in turn generate magnetic fields that are picked up by the reception coil (which is sometimes the same as the emission coil). The received electromagnetic signal, also called target detection signal or more simply detection signal or just signal hereinafter, has an amplitude that varies when the detection head moves above the target, proportionally to the magnetic fields produced by the flow of eddy currents generated in the target, and received by the detection head. The received electromagnetic signal is then amplified and processed by the control electronics so as to isolate the signal associated with the desired target and to separate it from interfering signals (industrial interference, meteorological interference, variation associated with the ground, with the Earth's magnetic field, interfering targets, etc.).

The effective detection range of the metal detector depends on the type of target and on the technology used by the manufacturer of the detector. It is limited by the signal-to-noise ratio (or SNR), which depends on the physical characteristics of the control electronics of the metal detector, on the signal processing that is implemented and on the various interfering signals to which the detection disc is subjected. The majority of detectors therefore have a threshold setting below which the detection signal is not taken into account, either because it is situated within noise or because it is desired to deliberately ignore excessively small targets.

Other information is deduced from the signals analysed by the detection head. This is what is called "discrimination" information, which enriches the main information relating to the intensity level of the target detection signal with data regarding the characteristics of the target (for example its ferrous or non-ferrous nature) and/or its surroundings (for example the characteristics of the ground, such as conductivity). The relevance of this discrimination information is highly dependent on the signal-to-noise ratio of the detector.

The signal amplitude and discrimination information may be rendered to the user via various sensory channels, in particular auditory or visual ones. Audio rendering is preferable and is most commonly used since it allows the user to stay focused on sweeping the ground with the detection head.

PRIOR ART

The approaches described in this subsection could be applied, but are not necessarily approaches that have been developed or applied previously. Therefore, unless indicated otherwise in this text, the approaches described in this section do not constitute prior art for the present application and are not recognized as such by virtue of their inclusion in this section.

The detection signal has an amplitude that varies when the detection head moves above the target, proportionally to the magnetic fields produced by the flow of eddy currents generated in the target and received by the detection head. Analysing this signal makes it possible to detect targets, by providing the user with indications for assisting him in detecting and identifying metal targets. These indications are extracted from the electromagnetic detection signal using signal processing techniques that are known per se. They are generally presented, i.e. rendered to the user in acoustic form using an electroacoustic transducer, such as for example an audio headset. To this end, an audio signal is generated from the electromagnetic detection signal and is delivered to the user's audio headset, for example a wireless headset.

Some audio rendering methods that may be used consist in generating a sound the amplitude and/or frequency of which are modulated by the amplitude of the detected signal. For example, the audio signal with the highest amplitude may indicate the position of the target closest to the detection disc. It is also possible to use such amplitude modulation of the signal, the frequency of which is furthermore determined by the discrimination information. It is also possible to simultaneously modulate the amplitude and the frequency of the audio signal based on the detection signal. In general, the loudest and highest-pitched audio signal indicates the position of the target closest to the detection disc. It is also possible to perform amplitude modulation and/or frequency modulation while keeping certain frequency ranges for certain types of target, and other frequency ranges for other types of target, respectively. Ferrous targets may thus for example be signalled by far lower frequencies than non-ferrous targets.

It is also possible to modulate the amplitude of the audio signal by varying the duty cycle of a square-wave signal attacking the electroacoustic transducer. For example, the duty cycle thereof changes from 0% for a signal with zero detection to 50% (i.e. to a square-wave signal) for the strongest detection signal. Besides the ease of implementation on the hardware level, this exhibits the advantage of coupling the variation in amplitude of the audio signal to a spectral variation, that is to say a variation in the frequency content of this audio signal, thereby allowing the user to have better sensory analysis than a pure amplitude variation, while still keeping the option of a frequency modulation to indicate discrimination information to said user.

Various settings may make it possible to set the detection threshold from which a sound is generated (no sound being produced for a detection signal below this threshold), along with the sound level of the rendered audio signal, and possibly to modify the various frequencies used to generate the sound. In the absence of frequency modulation, the sound may be muted when the level of the target is below the threshold selected by the user, or the detector detects particular targets (ferrite for example). Where appropriate, the use of frequency modulation to indicate the amplitude of the target detection signal may include a setting for adjusting the continuous sound level that is produced in the absence of a target ("baseline"), or for opting for the absence of an audio signal ("mute"), and a setting for the base frequency, that is to say the frequency of this continuous sound.

Nevertheless, a problem still remains with regard to taking into account the dynamic range of the detection signal in the rendered audio signal. It will be noted that, in the context of the invention and within the scope of the present description, the term "dynamic range" applied to the detection signal is understood to mean the difference between the lowest amplitude and the highest amplitude of said detection signal. Moreover, when it is used with reference to the audio signal rendering the detection signal to the user in acoustic form, the term "dynamic range" is understood to mean the difference between the lowest sound level and the highest sound level of said audio signal. Either way, the difference is generally expressed in decibels (dB), which is a relative unit of measurement, on a logarithmic scale, between a given level and a determined reference level.

Indeed, it will be observed that the dynamic range of the signal associated with metal targets is very large. It may commonly exceed 100 dB depending on whether the target is small and far away, on the one hand, or large and nearby, on the other hand. However, although amplitude modulation of an acoustic signal is used to translate, i.e. render the variation in amplitude of the target signal, it produces sound level variations that exceed the capabilities of the human ear.

The dynamic range of the human hearing system is theoretically around 120 dB at 1 kHz, but the useful dynamic range is in fact far smaller. At maximum values, the limit is given by damage that may be caused by excessively high levels. European directive 2003/10/CE, for example, in this regard recommends not exposing company employees to sound levels greater than 80 dB SPL(A), where the acronym SPL denotes sound pressure level, for eight hours. Also, the limit authorized by European legislation for audio players is 85 dB SPL (A). For the minimum values of the dynamic range, the rendering of the audio signal is limited by the background noise that is present. Within a quiet office space, background noise is of the order of 40 dB SPL (A), and it may be of the order of 30 dB SPL (A) in a quiet outdoor environment, for example in a forest. However, it may be far higher in other outdoor environments, typically of the order of 43 to 48 dB SPL (A) in the jungle, for example. However, in order to be clearly perceptible to the human ear, an acoustic signal should have a sound level of around ten decibels above that of background noise. This therefore gives a useful sound level range of typically between 30 and 48 dB(A) plus 10 dB(A) for quiet sounds, on the one hand, and 85 dB(A) for loud sounds, on the other hand, that is to say a dynamic range of 27 dB to 45 dB.

The surplus dynamic range between the dynamic range of the detection signal (that is to say more than 100 dB) and the desired dynamic range of the audio signal for acoustic rendering to the user (from 27 dB to 45 dB) is therefore of the order of 50 to 80 dB. With rendering of the detection signal through amplitude modulation of an acoustic signal, the user then has the choice either to lower the overall sound level, thereby reducing the amplitude of the audio signal uniformly throughout its variation range, at the expense of no longer hearing relatively small and/or distant targets, or to set the sound level associated with small targets so as to hear them comfortably, but at the risk of being harmed by an excessive sound level in the case of detecting relatively large and/or nearby targets. In extreme cases, excessive sound levels risk leading to hearing losses for the user.

In the scientific article entitled "*Auditory issues in Hand-Held Landmine Detector*", by Nancy L. Vause et. al., SPIE conference "*Detection and Remediation Technologies for Mines and Minelike Targets IV*", Orlando, Florida, SPIE Vol. 3710 (April 1999), the authors reveal that numerous detectors available on the market use acoustics signals that are rendered with a level considered to be harmful or that may force the user to temporarily change a detection threshold.

In the article entitled "*Auditory signals for enhanced operator performance with hand-held mine detector*", by Gene Ferguson et al., in "*Detection and Remediation Technologies for Mines and Minelike Targets V*", Proceedings of SPIE Vol. 4038 (2000), the authors (some of whom are the same as in the above article) note that this issue requires urgent attention since the current audio interface of the HSTAMIDS (for "Hand-held Stand-off Mine Detection System") detection system is capable of generating acoustic signals at a level of 120 dB (MD) and 114 dB SPL (GPR) for GPR (for "Modern Ground Penetrating Radar") and MD (for "Metal Detection") technologies, respectively, which exceed the sound levels for non-hazardous presentations for military and civilian applications. They furthermore reveal that the current MD subsystem of the HSTAMIDS system generates a continuous baseline signal that may reach 83 dB SPL with the volume control fully open.

U.S. Pat. Nos. 4,594,559 and 4,644,290 (1987), granted to David S. Bernzweig, which relate to an audio amplifier for a metal detector, disclose an auxiliary device to be used with a metal detector and having means for amplifying the low audio output of the metal detector, which is barely audible, such that it is able to be easily heard with additional means that are designed to dampen the loudest audio output signals by making these signals quieter. This device makes it possible to limit the dynamic range of the signal in a very frustrating manner and introduces signal deformations, meaning that it cannot be used with modern apparatuses.

Some metal detector manufacturers (for example Minelab Electronics Pty Ltd., on its GPX4000™, GPX4500™, GPZ7000™, etc. models) are aware of the problem and add a volume limit setting that makes it possible to cap the volume of the sound emitted by the detector at an upper limit value. The manufacturer alerts the user in the instruction manual of one of these models, in these very explicit terms: "If the Volume Limit is set to maximum all target signals will be heard, and will sound proportional to the target size and depth. Maximum limit allows you to hear the difference between a small and large target, but may be uncomfortable to your hearing if a large target is found close to the coil"; or else "If the Volume Limit is set to minimum most target signals will potentially be very limited. A low volume will be more comfortable on your hearing but will increase the risk of missing small target signals". The same manufacturer also alerts users of its models with the following warning: "Caution: The detector is able to produce an extremely high volume if a large or shallow target is located.

Protect your ears!".

In other words, this means that the volume limit setting and methods based on limiting the amplitude of the audio signal make it possible to effectively reduce the maximum level of the audio signal that is presented to the user, but the dynamic variations in the detection signal corresponding to the area of the audio dynamic range in which this limit takes place are then completely annihilated.

Using a square-wave signal the duty cycle of which varies with the level of the target detection signal for the audio rendering provides an advantage. Indeed, although the effective value of a pulsed signal varies linearly with the duty cycle thereof, the same does not apply to the sound level that is experienced ("loudness"). Indeed, if observing the spectral content of various square-wave signals with different duty cycles, it is noted that the spectral energy distribution varies considerably. The lower the duty cycle, the richer (relative to the fundamental) the harmonic content becomes, so as to achieve a "flat" spectrum in the audible frequencies for duty cycles less than 1% (for frequencies of 500 Hz or more). However, the sensation of sound level as perceived by a human being varies in a complex manner with the spectral composition and the sound level.

For example, the ISO 226:2003 standard discloses isophonic curves (i.e. equal level of sensation) as a function of frequency and acoustic pressure for pure sounds (sinusoidal signal), which clearly illustrate this variation in sensation.

For complex signals, such as those corresponding to a square-wave signal with a variable duty cycle, the isophonic curve is more difficult to develop, since it depends, in a complex manner, on the energy present in various frequency bands analysed by the ear. These bands, called critical bands, have a width of around $0.2 \times F$ for frequencies F greater than 500 Hz, meaning that, for a signal the fundamental of which is at 500 Hz (which is a typically used audio signal fundamental frequency), the first ten harmonics are located in separate critical bands and each contribute to the overall sound level sensation. These first ten harmonics are also located in the area of maximum sensitivity of the ear, all the more so when the acoustic level is low. Thus, when the duty cycle decreases, the relative increase in the amplitude of the first harmonics in the various critical bands analysed by the ear to a large extent compensates for the decrease in the effective value of the signal in its entirety (all the more so when the signal decreases), which contributes to a constant level sensation even though the effective value of the square-wave signal decreases. This results in a kind of natural "compression of the dynamic range" if this type of square-wave signal with a modulated duty cycle is used. This "compression of the dynamic range" depends largely on the acoustic rendering devices, in particular on the quality of the audio headset and/or of the speaker, and on their capabilities in terms of rendering said harmonics, along with the sensitivity of the user's ear: hearing losses often produce an attenuation in frequencies around 4000 Hz in the area in which the variations in the level of the harmonics in the signal is particularly sensitive, thereby impacting the effect of this dynamic compression for users affected by such hearing losses.

This dynamic compression may reach around thirty dB in the best case scenario for a 500 Hz signal. To improve this compression further, the curve of variation in the value of the duty cycle could be modified so as to give preference to the dynamic variation experienced in a particular area of the dynamic range of the detection signal. However, this dynamic adaptation has limits, since it falls within the context of a square-wave signal with a variable duty cycle the sound of which, for low levels (and therefore for small duty cycles), may be unpleasant due to its particularly rich harmonic content.

OBJECTS AND SUMMARY

The aim of the invention is to improve the dynamic range of audio signals generated by a metal detector, such that the quietest signals are audible, that the loudest signals do not cause hearing damage, and that the acoustic volume is able to be perceived gradually for the intermediate-level signals.

This aim is achieved, according to some embodiments, by modifying the dynamic range of the electromagnetic target detection signal, so as to make this dynamic range compatible with the dynamic range actually able to be used by the human hearing system.

To this end, a first aspect of the invention proposes a method for generating an audio signal suitable for the acoustic rendering, to the user of a portable metal detection apparatus, using at least one electroacoustic transducer, of an electromagnetic target detection signal the amplitude of which may vary with a determined dynamic range, the method comprising the following steps:

reducing the dynamic range of the detection signal so that it corresponds to a desired dynamic range of the audio signal; and generating the audio signal on the basis of the detection signal with the reduced dynamic range, and wherein reducing the dynamic range of the detection signal comprises:

clipping the detection signal on the basis of a determined detection threshold;

applying, to the clipped detection signal, an overall determined dynamic range compression rate, strictly between 0 and 1, which depends on the ratio between the dynamic range of the detection signal and the desired dynamic range of the audio signal; and shifting the compressed detection signal so as to set a desired minimum level of the audio signal, and wherein applying an overall dynamic range compression rate to the clipped detection signal comprises segmenting the dynamic range of the detection signal into a plurality of separate portions, and also applying respective local dynamic range modification rates to different portions of the clipped detection signal.

Segmenting the dynamic range of the detection signal into multiple portions and applying respective dynamic range modification rates to each of these portions has the effect that the overall modification of the dynamic range of the detection signal is able to be more complex, thereby giving an audio signal with a potentially better sensation for the user.

According to one particular mode of implementation, some portions of the dynamic range of the detection signal are defined by linear segments. The implementation is thus simpler.

According to one particular mode of implementation, at least one local dynamic range modification rate is greater than or equal to unity. Thus, and notwithstanding the overall compression of the dynamic range, some local portions of the dynamic range may be magnified by extending the dynamic range locally.

The method may furthermore comprise, before the step of reducing the dynamic range of the detection signal, logarithmic conversion of said detection signal on a logarithmic scale, and applying the overall dynamic range compression rate to the clipped detection signal or applying a local dynamic range modification rate to a determined portion of the clipped detection signal, and may then comprise multiplying said clipped detection signal or said clipped detection signal portion, respectively, by said overall dynamic range compression rate or by said local dynamic range modification rate, respectively. The calculations are therefore easier to implement for a processor, since they involve a simple multiplication of the values of the amplitude of the detection signal on the logarithmic scale.

The method may furthermore comprise, after reducing the dynamic range of the detection signal and before generating the audio signal, inverse conversion of the logarithmic conversion of the received detection signal in order to return the dynamic range of the compressed and shifted detection signal to a linear scale.

According to one particular mode of implementation, clipping the detection signal comprises clipping said signal below the detection threshold; and shifting the compressed detection signal may then comprise adding a value corresponding to a desired minimum level of the audio signal.

According to one particular mode of implementation, the detection threshold and/or the value corresponding to the desired minimum level of the audio signal are programmable. These parameters may thus be set by the user based on his expectations and/or his experience in metal detection.

In one particular mode of implementation, generating the audio signal may comprise generating an acoustic signal having a fundamental component of a determined level, and modulating said acoustic signal with the compressed and shifted detection signal.

According to one particular mode of implementation, generating the audio signal furthermore comprises changing the timbre of the acoustic signal, between two respective portions of the dynamic range of the detection signal. The audio signal is thus qualified by spectral content that is slightly modified from one area to another of the dynamic range of the detection signal, in addition to the variation in the sound level.

For a better user experience, the change in timbre of the acoustic signal between two contiguous portions of the dynamic range of the detection signal may be gradual from one to the other.

According to one particular mode of implementation, reducing the dynamic range of the received detection signal furthermore comprises, after clipping the detection signal but before applying the overall dynamic range compression rate to the clipped detection signal, half-wave rectification of said clipped detection signal. In other words, any negative values of the dynamic range of the detection signal after subtracting the value of the audibility threshold are eliminated. This thus ensures having a minimum value that is equal to zero at input of the downstream part of the processing chain.

In a second aspect, the invention also proposes a computer program product comprising instructions that, when the program is executed by a computer, prompt said computer to implement all of the steps of the method according to the first aspect.

A third aspect relates to a data processing device comprising a processor configured to implement all of the steps of the method according to the first aspect.

Lastly, a fourth and final aspect of the invention also relates to a portable metal detection apparatus comprising a device according to the third aspect above and at least one electroacoustic transducer for rendering the audio signal to a user of the apparatus.

BRIEF DESCRIPTION OF THE DRAWINGS

Other features and advantages of the invention will become more clearly apparent upon reading the following description. Said description is purely illustrative and should be interpreted with reference to the appended drawings, in which:

FIG. 1 is a schematic depiction of the main functional elements of one example of a metal detector in usage conditions, during a detection session carried out by a user;

FIG. 2 is a functional diagram showing, in the form of a block diagram, the architecture of an electromagnetic metal detector able to implement the audio rendering method according to some embodiments;

FIG. 3 is a graph of the evolution, as a function of the distance "d" between the detection head and the target, of the attenuation (in decibels, or dB) of the amplitude of the electromagnetic detection signal coming from the detection head of a metal detector;

FIG. 4 is a functional diagram (block diagram) of a device according to some embodiments of the invention, designed to implement the method according to some modes of implementation of the invention;

FIG. 5 is a graph showing the evolution, as a function of time, of one example of an electromagnetic detection signal as coming from the detection head during a single movement of sweeping the detection head of a metal detector above a target;

FIG. 6 gives graphs of one example of an audio signal for the acoustic rendering of the signal from FIG. 4 using a method with a constant dynamic range, for respective gain values;

FIG. 7 gives a graph of one example of an audio signal for the acoustic rendering of the signal from FIG. 4, implementing a method for limiting the dynamic range of the audio signal through upward and downward clipping;

FIG. 8 gives a graph of one example of an audio signal for the acoustic rendering of the signal from FIG. 4, implementing the method for compressing the dynamic range according to some modes of implementation of the invention;

FIG. 9 gives the graphs from FIG. 7 and from FIG. 8 superimposed on one another, to illustrate the comparison between the shape of the audio signal for the acoustic rendering of the signal from FIG. 4 using the method for limiting the dynamic range of the audio signal through upward and downward clipping and the shape of this audio signal for the acoustic rendering using the method for compressing the dynamic range according to some modes of implementation of the invention, respectively; and FIG. 10 is a graph illustrating one mode of implementation in which the target detection signal is segmented so as to define multiple areas in which it is possible to have different respective compression levels.

DESCRIPTION OF EMBODIMENT(S)

With reference to FIG. 1, a modern metal detector 10 has an architecture with three elements, these three elements communicating with one another via a wireless digital link, for example a radio link. These three elements are:

first of all, a detection disc or else detection head that incorporates the one or more emission and/or reception coils;

second of all, a control module 12, also called remote controller, that makes it possible to configure all of the various functions of the detector using a suitable human-machine interface (or HMI); and also third of all, an audio rendering device 13, which may be a wired audio headset or preferably a wireless audio headset, one or more speakers or a bone conduction device, comprising electroacoustic transducers (for example one for each ear) able to render the detection signal in a form audible to the user.

It will be noted that all or some of the electronics for managing the emission, the reception and the processing of the detection signals in order to detect and discriminate targets may be integrated into the detection head, or into the remote controller, or else be distributed between the detection head and the remote controller.

Furthermore, the detector is generally additionally provided with a shaft that has a handle and an armrest. The end of the shaft opposite the armrest and the handle is designed to carry the detection disc, which may be coupled thereto in a removable manner. The remote controller is designed to be fastened to the shaft, just before the handle, as shown in FIG. 1.

Thus, when the user 1 extends the shaft thus equipped with the detection disc and the remote controller in front of him, and when he holds said shaft in his hand by way of the handle with the corresponding arm resting correctly in the armrest as shown in FIG. 1, he is able to move the detection disc with lateral sweeping movements parallel to the ground, while still having the possibility of using his other hand to act on the remote controller in order to modify the settings of the detector if necessary.

A person skilled in the art will appreciate that the modes of implementation of the invention are not limited to metal detector technology. Solely by way of example, and with reference to the technologies disclosed in the introduction of the description, it will be considered here for the purposes of the present inscription that what is involved is an induction balance (IB) detector operating in CW mode.

It is possible to break down the architecture of a metal detector in the way that will be described below with reference to the functional diagram of FIG. 2. This functional division makes it possible to distinguish the main functions provided by the detector, but does not limit the way in which these functions are implemented on the hardware level, some functions being able to be grouped together or, by contrast, dissociated within determined hardware elements, which may also implement additional functions that are not considered here as they are not essential to the disclosure of the embodiments of the invention.

The detector comprises an electromagnetic emission/reception assembly 21, comprising the one or more coils, specifically at least one emitter coil and at least one receiver coil, in the knowledge that these two coils may also be just one. This assembly 21 is installed in the detection head 10 of FIG. 1.

The detector also comprises an analogue front-end module 22 (or eVLF FE, where "FE" stands for "front end", and where the term "eVLF" is derived from the term "VLF" (for "Very Low Frequency"), which denotes the frequency band from 3 kHz to 30 kHz), and also a digital front-end module 23 (or DFE, for "Digital front end"). The assembly of these two front-end modules ensures the emission (Tx) of the incident magnetic field.

In the reception (Rx) direction, the front-end modules 22 and 23 ensure the transposition of the analogue signals suitable for the coils into very-low-frequency signals (generally lower than 100 Hz) representative of the passing of the detection head above the target, by applying a frequency transposition, this being able to be performed through demodulation and associated filtering. More often than not, the analogue front-end module 22 incorporates the power amplifications of the emission chain (Tx) and the low-noise amplifiers of the reception chains (Rx). The VLF band is generally used, but lower frequencies and higher frequencies, i.e. frequencies in a frequency range wider than the VLF band, for example between 1 kHz and 100 kHz, may also be used to detect metals during specific searches. This is why reference is made here to an "extended" VLF band (denoted eVLF), this expression (and this acronym) not necessarily belonging to language common to a person skilled in the art in the technical field under consideration. The analogue front-end module 22 may also integrate the demodulators, but the demodulators are more often than not implemented in the digital front-end module 23 for narrowband detectors.

A person skilled in the art will furthermore appreciate that the analogue/digital separation depends on the design of the equipment, and is not limited in practice by the examples considered here.

The device 10 also comprises a detection processor 24, which is designed to apply the detection processing operations in order to determine the presence and possibly the type of metal targets.

In practice, the detection processor 24 may be implemented in the form of a miniaturized electronic circuit, thereby allowing it, in some metal detectors, to be able to be integrated into the detection disc 11 (FIG. 1). Such a circuit is designed to digitize and analyse the detection signals and to produce the detection data and the discrimination data, these data then being sent in real time to the user interface 25 (see further below), for example via digital radio link as shown in FIG. 1 or else through a wired connection, for acoustic rendering by the audio headset 13 and possibly also for display on the remote controller 12.

The performance of the detector may be affected by the various mineralization levels of the ground that may be encountered depending on the use case. These may be for example magnetic mineralizations of natural origin: iron oxide, ferrites, magnetites. They may also be one-off mineralizations (themselves also magnetic) linked to sites previously occupied by humans, for example fireplaces, terracotta, ferrites, slag, etc. They may also be coastal mineralizations that may range from magnetic grade (black sand) to electrical conductor grade (saltwater), depending on beach and region. In FIG. 2, the electromagnetic interference is symbolized by the cloud 26.

The detection is also disturbed by electromagnetic interference (or EMI), which is plentiful in particular in an urban environment (high-voltage line, electrical transformer, electric fence, electricity lines, radio relays, mobile telephones, computers, television sets, other metal detectors operating nearby, etc.) and by metal pollution. In FIG. 2, the electromagnetic interference is symbolized by the cloud 27.

Lastly, the detector comprises a human-machine interface, also called user interface 25 (or HMI). The user interface 25 makes it possible to configure the equipment, on the one hand, and to render information indicating the possible presence of metal targets and, possibly, also information relating to their identification, and also possibly information for assisting with detection in order to assist the user with his search, on the other hand. As has already been indicated in the introduction, audio rendering is the interface most commonly used for this purpose, and it is this that is the subject of the present invention. The user interface 25 thus comprises the audio headset 13 from FIG. 1 and/or any other electroacoustic transducer, for example one or more speakers.

Nevertheless, all or some of the abovementioned information may also be rendered in another form, for example in a form visible through display on a screen. To this end, the user interface 25 comprises the remote controller 12 (FIG. 1). The remote controller also allows the user to adjust the main detection settings such as sensitivity, discrimination, ground effects, tonalities, the one or more frequencies used for the signals emitted and processed by the detection head, volume, etc., but also to select factory programs or those created beforehand by the user himself with the remote controller. These settings modify the detection, this being symbolized in FIG. 2 by the dotted arrow 20.

To sum up, the user interface may be implemented in the remote controller 12, and it also comprises the audio headset 13 for the audio rendering of the detection signal to the user, said headset being able to be considered to be a peripheral dedicated to the audio rendering of the detection signal. In some embodiments, the audio headset may also comprise buttons or the like to perform certain settings on the detector, in particular but not only settings relating to the acoustic rendering of the detection signal. Furthermore, it will be recalled that the audio signal that is generated for the acoustic rendering of the electromagnetic detection signal is derived from said detection signal received in "raw" form by the detection head through operations of demodulation (in the broad sense) and one or more derivation/filtering operations in order to achieve a characteristic very-low-frequency signal (with a frequency generally less than around one hundred hertz).

The electromagnetic detection signal (more simply called the "signal" here) has an amplitude that varies when the detection head moves above the target, proportionally to the magnetic fields produced in the target by the flow of eddy currents and received by the detection head. For small targets, the amplitude of the magnetic field at the target is proportional to $1/(a^2+d^2)^{3/2}$, where "a" denotes the diameter of the detection head (and therefore substantially the diameter of the emission and/or reception antennas), and where "d" denotes the distance from the head to the target. The amplitude of the signal received by the reception head when this sweeps over a target at a given distance corresponds to a round trip of the signal. It therefore varies approximately with a relationship of the form $K \times 1/(a^2+d^2)^3$.

In a simplified case where the distance "d" from the head to the target is significant relative to the diameter "a" of the head, the curves 31 and 32 from FIG. 3 illustrate, respectively, the amplitude of the magnetic field at the target, which varies by $1/d^3$, that is to say in the form $K \times 1/d^3$, and the signal received at the reception head, which varies by $1/d^6$, that is to say in the form $K \times 1/d^6$, where K is a proportionality factor dependent on the conditions of use. The curves 31 and 32 correspond to one example of a use case for a small target, in which the detection head has a diameter of 28 cm (a=28 cm) and in which the reference distance do (which gives an attenuation of 0 dB) is substantially equal to 1 cm.

A disclosure will now be given of the features that may be used to present the user with information relating to the detection of a metal target, and discrimination information allowing said user, to a certain extent, to identify this target.

Reactivity is a parameter that defines the behaviour of the detector in terms of analysis speed and selectivity. Selectivity is understood to mean the ability to separate between targets. If a ground is polluted with ferrous materials, ferrites or other mineralized debris (hereinafter "pollutants"), the penetration of the ground is generally reduced, as is the ability of a detector to find nearby ferrous targets. Under these conditions, it is possible to choose a high reactivity level that makes it possible to speed up the analysis of the signals. By contrast, if the terrain is clean, that is to say relatively free from pollutants, it may be appropriate to slow down reactivity and scanning in order to be more sensitive to deep masses and penetrate further into the ground. Adjusting the "reactivity" parameter of the detector therefore makes it possible to make the detector more or less fast and selective.

Based on the reactivity function, the duration of the audio signal varies upon the passage of a target under the moving detection head: with a relatively slow reactivity, a target gives a relatively long sound and, vice versa, with a relatively high reactivity, the same target gives a relatively short sound. It will be noted that the duration of the sound of false signals (corresponding to the cracking of iron for example) also varies proportionally, i.e. varies in the same way as the duration of a target signal as a function of reactivity.

There are essentially three characteristics to consider in a sound:
  the pitch of the sound, which determines its degree of elevation between what is experienced (by a human being) as low-pitched and what is experienced as high-pitched;
  the intensity of the sound, which distinguishes a loud sound from a quiet sound; and
  the timbre of the sound, which makes it possible to distinguish between an "aggressive" sound and a "soft" sound.

Moreover, a sound is said to be "pure" when the sound wave is perfectly sinusoidal.

The pitch of a pure sound corresponds to its vibration frequency, which is measured in hertz (number of periodic vibrations per second). The faster the vibration, the more the sound is said to be high or high-pitched. Conversely, the slower the vibration, the more the sound is said to be low or low-pitched. Frequencies audible to a human being extend from 20 Hz to 20 000 Hz (20 kHz). A sound is generally considered to be high-pitched when its fundamental frequency is greater than (approximately) 2000 Hz (2 kHz). It is considered to be low-pitched when its fundamental frequency is lower than 200 Hz. In nature, however, a sound is almost never pure, that is to say it is formed of multiple sounds having different respective frequencies. Furthermore, the differences in timbre of a sound result primarily from the combination of the various harmonics of a sound, with various respective intensities. The timbre therefore depends primarily on the frequency spectrum of the sound, as explained further below.

The intensity of a sound is a variable that makes it possible to give an indication about the "strength" of the sound: the higher the sound intensity, the louder the sound perceived by the human ear. Sound intensity is denoted using the letter "I" and is expressed in watts per square metre ($W \cdot m^{-2}$). This unit indicates that it corresponds to a "rate" of energy per unit of surface area. On average, the human ear is able to perceive sounds having a sound intensity greater than a value of the order of $10^{-12}$ $W \cdot m^{-2}$. This minimum sound intensity is called audibility threshold "$I_0$". A sound the sound intensity of which is very high may cause pain to a human being, and also partial or total hearing loss. It is generally estimated that the pain threshold in a normal person corresponds to a value of around 10 $W \cdot m^{-2}$, which corresponds to 130 dB SPL, in the knowledge that the value on a decibel scale of a sound intensity I is given by $10 \times \log(I/I_0)$. Moreover, repeated exposure to high-intensity sound waves that are however lower than the maximum intensities, without appropriate protection, may also lead to damage to the human ear.

The timbre of a sound designates all of the particular characteristics that make it possible to distinguish two sounds having the same fundamental frequency and the same intensity but that do not give the same physiological sensations. For example, one and the same musical note, such as "Do", gives a specific sensation depending on whether it is played by different musical instruments, even though they then produce sounds having the same fundamental frequency and possibly having the same intensity. The timbre of a sound is therefore independent of its pitch and of its intensity. In nature, it is specific to the instrument or to the voice that outputs it. In physical terms, it is linked to the number and the relative intensities of the harmonics that make up the sound.

It will be noted that the sensation also depends on the form of the sound, that is to say on the waveforms of the various vibrations that make up said sound, which is linked to attack transients, to extinction transients, and to the body of the sound, that is to say to its properties between the attack and extinction transients. The attack of a sound may be relatively slow or relatively fast, and relatively gradual or relatively sudden. The body of a sound may for its part be relatively regular or with peaks, substantially sinusoidal or more complex, and with more or less amplitude. A distinction is thus conventionally drawn between a soft sound and a sharp (or aggressive) sound, even when they have substantially the same pitch and the same intensity.

In order to overcome the drawbacks of the art that were presented in the introduction, some embodiments of the invention propose a method and a device for modifying the dynamic range of the audio signal associated with the target and that is rendered to the user, so as to make this dynamic range compatible with the dynamic range actually able to be used by the human hearing system, while making it possible to dissociate between the variation in experienced level and the spectral content of the audio signal.

According to some embodiments, this modification of the dynamic range takes place, for the simplest implementation, through a reduction thereof achieved using the method and the device illustrated by the functional diagram of FIG. 4. This diagram is purely schematic, and the elements of this block diagram symbolize both the steps of the audio rendering method according to some modes of implementation of the method and the functional means of a device for this implementation. In other words, the diagram of FIG. 4 illustrates the detection signal processing chain that leads to the production of an audio signal Audio_Lev the pitch, intensity and timbre of which are generated so as to acoustically render, in a manner comfortably audible to the user, the entire amplitude dynamic range of the target detection signal and also, where appropriate, associated discrimination information when such information is also available.

With reference to FIG. 4, the target detection signal 20, resulting from a processing operation (not shown) intended to isolate said signal from noise, is routed to a linearization module 21 that is designed to convert the detection signal into decibels (dB). This makes it possible to obtain a signal Signal_Amp the amplitude of which varies approximately linearly as a function of the distance d from the target to the detection head. In one embodiment, the linearization device 21 may be a simple logarithmic amplifier. It goes without saying that other linearization methods may be contemplated.

A logarithmic amplifier may be formed from analogue electronic components.

In a manner known per se, an analogue logarithmic amplifier is a non-linear amplifier that produces an output representing the logarithm of the input signal.

As a variant, the logarithmic amplifier 21 may also be formed by digital processing, by linear or polynomial interpolation, for example.

The detection threshold of the metal detector is then subtracted from the linearized signal Signal_Amp. This subtraction operation is symbolized here by a subtractor 22, the positive input "+" of which receives the linearized signal Signal_Amp and the negative input "−" of which receives a value representative of the detection threshold. In some embodiments, as shown in FIG. 4, this value is generated by a threshold adaptation module that makes it possible to vary the detection threshold of the metal detector. This variation may be controlled "on demand" by the user using the remote controller of the detector, based on his sensation and/or his strategy of searching for metals. It may also result from implementing a particular pre-recorded program.

In one embodiment, the signal resulting from the abovementioned subtraction operation may then be subjected to half-wave rectification, symbolized in FIG. 4 by the symbol for a diode 23. A person skilled in the art will appreciate that the negative values of the signal at the output of the subtractor 22 correspond to levels of the signal Signal_Amp that are below the detection threshold of the detector. In other words, any negative values of the dynamic range of the detection signal after subtracting the value of the audibility threshold are eliminated by the filtering carried out by the rectifier 23. This thus ensures having a minimum value equal to zero at input of the downstream part of the processing chain.

The value of the signal at the output of the rectifier 23 therefore varies from 0 dB if the target signal is equal to said threshold to the maximum value of the dynamic range between the threshold and the maximum amplitude (in decibels) of the detection signal, that is to say potentially more than 100 dB as was explained in the introduction of the present description.

According to the teaching of the embodiments of the invention, this difference with respect to the threshold is in turn multiplied by the desired dynamic range compression rate. This is equal to unity (that is to say to 1) for the absence of compression. To obtain compression, it is strictly between 0 and 1.

The dynamic range compression rate is typically equal to a value between 0.2 and 0.5 in order to reduce a dynamic range variation from 0 to 100 dB to a dynamic range variation from 0 to 30 dB, for example. In FIG. 4, this compression operation is represented by a multiplier, or multiplication operator 24, receiving the signal from the output of the rectifier 23 on a first input, and receiving a value representative of the compression rate on a second input. In some embodiments, as shown in FIG. 4, this value may be provided by a compression adaptation module 24a that makes it possible to vary the dynamic range compression rate.

A value representative of the audibility threshold "$I_0$" is then added, which corresponds to the desired minimum intensity of the audio signal, that is to say the quietest sound rendered to the user ("baseline"). In FIG. 4, this addition is symbolized by an adder, or addition operator 25, which receives the signal from the output of the multiplier 24 on a first input, and which receives the value representative of the audibility threshold "$I_0$" on a second input. In some embodiments, as shown in FIG. 4, this value is provided by an audibility threshold adaptation module 25a. This threshold may indeed be variable in order to be able to be adapted to the acoustic perception specific to each user.

In one example, the signal at the output of the adder 25 may vary with a desirable dynamic range, that is to say within an ideal interval, contained for example between 20 dB and 50 dB.

In some embodiments, the inverse operation of the linearization carried out by the linearization module 21 may then be performed. In other words, the signal is converted from decibel values to linear values. This operation may for example be performed using an exponential function with an appropriate gain.

The output of the conversion module 26 amplitude-modulates an audio signal produced by a sound generator 27, which is used to generate the sounds associated with the detection of a determined target. More specifically, the sound generator 27 is designed to produce sounds with a pitch (frequency) that depends for example on the distance between the detection head and the detected target. As will have been understood, the device according to some embodiments of the invention that is shown in FIG. 4 has the sole function of adapting the dynamic range of the intensity (volume) of the sound delivered at output to the dynamic range of the detection signal received at input.

The abovementioned function of modulating the amplitude of the audio signal generated by the generator 26 using the signal at the output of the conversion module 26 is symbolized, in FIG. 4, by a multiplier or multiplication operator 28. This receives the signal delivered by the sound generator 27 (modulated signal) on a first input, and receives the signal from the output of the conversion module 26 (modulating signal) on a second input. The multiplier delivers the output signal from the device, specifically an audio signal Audio_Lev with variations corresponding to those in the amplitude of the input signal 20, but within the desired sound intensity interval, that is to say the desired dynamic range of the audio signal.

In some embodiments, the audio signal generator 27 may furthermore receive information from a timbre variation module 27, making it possible to vary the timbre of the output audio signal as a function of the discrimination information generated by the metal detector, as was presented in the introduction.

A person skilled in the art will appreciate that the final conversion from a logarithmic scale (scale in decibels) to a linear scale carried out by the conversion module 26 is not absolutely necessary. Indeed, some devices, such as analogue-to-digital converters (ADC) or audio amplifiers, may receive the information in decibels directly at input.

Furthermore, in some embodiments, a sound-muting circuit 99 may be arranged at the output of the detection threshold subtraction module 22. This module makes it possible to detect whether the signal is below the threshold level and to command, if necessary (for example depending on the audio mode chosen by the user), muting of the audio signal for signals below the detection threshold. This "mute" function is symbolized here by a controlled switch 29 operating in all or nothing mode, arranged between the output of the modulator 26 and the audio headset 13 and controlled by the circuit 99. It will be noted that a "mute" may also be generated in the same way in the case of detecting targets of a certain particular type or of multiple particular types in order not to needlessly alert the user if the detected target does not correspond to the desired type of target.

Lastly, a person skilled in the art will appreciate that a setting for the overall audio gain of the processing chain from FIG. 4, not shown here, may be integrated into the processing chain. As a variant, it may be implemented in the form of a volume setting associated with the audio headset 13. Said audio headset may of course be replaced with a speaker without this changing the principle of the invention. Setting the gain does not form part per se of the present disclosure insofar as the invention relates to the dynamic range of the audio signal at output in order to satisfactorily render the entire dynamic range of the detection signal at input.

To sum up, the invention makes it possible to compress the dynamic range of the target detection signal in order to correspond to the desired dynamic range of the audio signal that is generated in order to acoustically render this detection signal, the dynamic range being understood here to mean the difference between two extreme values. With regard to the detection signal, the dynamic range extends more particularly from the range of amplitude values of the signal that is between a lower end and an upper end. For the audio signal rendered to the user, the dynamic range represents the ratio between the loudest sound (having the highest sound intensity) and the quietest sound (having the lowest sound intensity). The invention makes it possible, in the context of metal detection, to avoid the loss of detection signal at the lower end and to limit or clip the detection signal at the upper end of the amplitude variation range, in the corresponding audio signal that is generated in order to acoustically render this detection signal to the user.

This technical effect will now be explained with reference to the graphs in FIGS. 5 to 9.

FIG. 5, first of all, shows the evolution of the amplitude, as a function of time, of one example of an electromagnetic target detection signal. In this example, a metal target is detected within a time window (temporal window) of a width equal to 40 ms, between the times t=30 ms and t=70 ms, plotted on the abscissa. The signal portion shown in the figure comes from the detection head of a metal detector upon a single sweeping movement of the detection head above a metal target. More particularly, in FIG. 5, the detection signal is shown on the ordinate on a logarithmic scale. It is for example the version Signal_Amp of the detection signal taken at the output of the linearization module 21 from FIG. 4. On this scale, the curve 51 representing the signal has a bell shape: the rising part corresponds to the detection head approaching the target, the top of the Gaussian corresponds to the time (at the time t=50 ms in the example) at which the head is closest to the target and the falling part of the Gaussian corresponds to the detection head being moved away from the target.

In fact, the curve 51 corresponds to the payload detection signal S_in mixed with detection noise that originates from various interfering elements illustrated symbolically in FIG. 2 by the clouds 26 and 27. The maximum noise level N is represented by the dotted horizontal line 52. The maximum amplitude of the noisy signal (S_in+N) is represented by the dashed horizontal line 53. As may be seen, the dynamic range Dyn_Sin of the payload detection signal (non-noisy signal S_in), represented here by the dashed vertical arrow 50, corresponds to a range of amplitude values that extends, on the logarithmic scale that is shown, between the minimum and maximum values of the noisy signal S_in+N, which are equal to 20 dB and 120 dB, respectively. This dynamic range 50 is therefore equal to 100 dB.

FIG. 6 gives graphs of one example of an audio signal for the acoustic rendering of the signal from FIG. 4 using a method with a constant dynamic range, in which it is made do to vary the gain of the processing chain for processing the detection signal to be rendered generating the corresponding audio signal. More particularly, the graphs 61 and 62 correspond to values of the maximum gain G+ and minimum gain G−, respectively, that would be chosen as follows:

the gain would be set to the maximum value G+ such that the entire audio signal is located around 10 dB(A) above the level of ambient acoustic noise (which may be estimated to be at least 30 dB(A) as explained in the introduction, but is attenuated due to the use of an audio headset by a value that may be estimated to be equal to 10 dB) in order to be able to be distinguished from this noise; while the gain would be set to the minimum value G− such that the entire audio signal is situated below the limit level imposed by law (established at 80 dB(A) as explained in the introduction).

It will be appreciated that the rendering of the dynamic range 50 of the amplitude of the detection signal from FIG. 5 gives, in the case of the gain G+ corresponding to the curve 61, audio signal values that may reach 130 dB SPL (A), therefore far greater than the maximum hearing comfort threshold Lev_max of 80 dB SPL (A) represented by the dashed horizontal line 64, this not being tolerable and therefore requiring the audio signal to be clipped to this threshold in order to protect the user's hearing. Conversely, in the case of the gain G− corresponding to the curve 62, the audio signal rendering the entire dynamic range of the detection signal (which is 100 dB) may drop to values of the audio signal far below the audibility threshold Lev_min represented by the dotted horizontal line 63, that is to say below 30 dB SPL (A) taking noise into account. In this case, the corresponding variations in the detection signal are lost in the audio signal that is rendered to the user.

The combined effect of limiting the dynamic range Dyn_Sout resulting from the upward clipping and from the downward loss of amplitude variations in the detection signal is illustrated graphically by the curve 70 in FIG. 7. This curve shows the evolution, as a function of time and for a determined value of the gain of the rendering chain, of the audio signal S_Ltd that is limited by the two phenomena presented above. As may be seen, the dynamic range Dyn-_Sout of the audio signal that renders the detection signal to the user is advantageously between the range of comfortable values, between 20 dB SPL (A) and 80 dB SPL (A), corresponding to a signal that is both audible taking into account ambient noise and complies with the integrity of the user's hearing.

A person skilled in the art will appreciate that any value of the gain G of the processing chain between the minimum value G− and the maximum value G+ presented above with reference to the graphs of FIG. 6 exhibits, to a greater or lesser extent, to respective degrees weighted relative to one another, the drawbacks mentioned in the above text with regard to the curve 62 and the curve 61, respectively. The higher the gain G between the values G− and G+, the more preference is given to the acoustic rendering of the variation in the low amplitude values of the detection signal, to the detriment of rendering the variation in the high amplitude values, which are suppressed by clipping the audio signal. Conversely, the lower the gain G between the values G− and G+, the more preference is given to the acoustic rendering of the variation in the high amplitude values of the detection signal, to the detriment of rendering the variation in the low amplitude values, which are lost in the audio signal insofar as they are not audible to the user.

In other words, the user may by all means vary the gain linearly for the entire amplitude range of the detection signal in order to give preference to the acoustic rendering of low amplitudes or that of high amplitudes of the detection signal, but in any case the useful dynamic range Dyn_Sout of the audio signal as shown in FIG. 6 by the dashed vertical arrow 60 renders the dynamic range Dyn_Sin of the target detection signal (see arrow 50 in FIG. 5) only with a great deal of imperfection. In yet other words, the variation in the gain of the processing chain performed linearly in the entire variation range of the detection signal does not make it possible in one way or another to find a compromise between the loss of the variations in the detection signal at the lower end of the amplitude range, one the one hand, and the limitation by clipping the audio signal at the upper end of the amplitude range, or the other hand, in the corresponding audio signal that is generated in order to acoustically render this detection signal to the user.

Conversely, the audio signal that is generated according to some embodiments using the technique of compressing the dynamic range Dyn_Sin of the detection signal provided at input with a compression rate adapted so as to correspond to the useful dynamic range Dyn_Sout of the output signal, which is shown by the graph 81 in FIG. 8, complies with the variations in the amplitude of the detection signal. This may be seen in that the curve 81 in FIG. 8 corresponds to the curve 51 in FIG. 5, while being "gathered up", that is to say compressed within the interval of values (on the decibel scale) between 30 dB SPL (A) and 80 dB SPL (A).

To facilitate the comparison, the curve 71 in FIG. 7 and the curve 81 in FIG. 8 are superimposed in FIG. 9.

In one mode of implementation illustrated by the graph in FIG. 10, the target detection signal is segmented so as to define multiple portions or areas in which it is possible to have associated compression rates, called local dynamic range compression rates, which may be different from one area to another. The graph shows, on the ordinate, the level of the audio signal in decibels (dB), denoted "Audio_Lev", as a function of the amplitude (in dB) of the target detection signal, denoted "Signal_Amp" and shown on the abscissa. In FIG. 10, the reference level giving 0 dB corresponds to the maximum level that is comfortable to the user, and that the user is able to set with the volume setting. Moreover, in the example that is shown, the dynamic range Dyn_Sout of the audio signal is 40 dB here, between −40 dB and 0 dB.

In the mode of implementation shown in FIG. 10, the detection signal is segmented into three portions or areas, respectively Z1, Z2 and Z3, corresponding to respective intervals of its dynamic range, for example areas that are contiguous pairwise. However, this is not limiting. A person skilled in the art will in particular appreciate that the dynamic range of the target detection signal may be subdivided into just two portions, or conversely into four or more portions.

In the example considered here, the first portion corresponds to what is called the "false signal" area, which corresponds (for example) to a dynamic range 10 to 20 dB above the detection threshold. A second portion Z2 corresponds to what is called the "average signal" signal area, from the end of the area Z1 to for example 60 dB above the detection threshold, followed by the portion Z3, corresponding to the strong signal area, after 60 dB above said threshold. The portions of the dynamic range corresponding to the first and the last area, Z1 and Z3 respectively, may thus be modified by local dynamic range compression rates lower than the one that is applied to the portion of the dynamic range corresponding to the area Z2, for the purpose for example of magnifying the target signals in the average signal area Z2.

It will be noted that there are in fact two implicit additional areas: the first is the area Z0 of the dynamic range that is below the detection threshold, which may correspond to a "mute" of the rendered audio signal; and the second is the area Zsat of electrical (or digital) saturation that corresponds to the highest levels of the dynamic range of the detection signal. For reasons relating to ease of implementation, the various areas may be defined by linear segments. It is also possible to use smoothing to remove slope separations at the "borders" between two contiguous areas, for example with spline smoothing.

It will be appreciated that the overall dynamic range compression that is sought does not prevent at least one local dynamic range modification rate from being greater than or equal to unity. In other words, one or more areas of the dynamic range of the detection signal may be locally extended (reference is then made to dynamic range extension or expansion rather than dynamic range compression), even though the dynamic range is compressed overall, that is to say if considering all of this dynamic range.

In one even further improved embodiment of the invention, at least some portions of the dynamic range may be associated with respective timbres of the audio signal. For example, each area from among the areas Z1, Z2, Z3 and Zsat may be associated with a different timbre. Furthermore, the timbre may change gradually upon the passage from one portion to another of the dynamic range. In other words, the change in timbre of the acoustic signal between two contiguous portions of the dynamic range of the detection signal is gradual from one to the other.

A person skilled in the art will appreciate that changes in timbre of the acoustic signal generated by the generator 27 that have been presented above are contained within the audio signal that is rendered to the user. Thus, these various modes of implementation provide selective spectral enrichment (that is to say enrichment dependent on the level of the signal) that improves the user's acoustic perception of the sounds generated in order to render the metal target detection signal.

The segmentation described above furthermore makes it possible to apply the associated spectral enrichments to the target discrimination methods in a differentiated manner, according to the received signal level and therefore according to the area of the dynamic range in which it is located, it being observed that the accuracy of the target discrimination is generally worsened for weak signals and for saturated signals. Many implementations may be considered, these being explained below.

In the first implementation, the oscillator that generates the final sound performs wave table reading. Each border of an area is associated with a previously calculated waveform, for example as a function of desired spectral content. The oscillator that generates the sound performs an interpolation between the two waveforms defined at the border of the activated area. It is thus possible for example to reserve, in the area Z1 for "false signals" (area with the weakest signals, lost in noise), a waveform the spectrum of which is relatively "soft" and to reserve a waveform in the most "aggressive" spectrum for the signals in the area Z3 of the dynamic range the amplitude of which is highest. Similarly, it is possible to use, for the strongest signals, waveforms resembling the spectrum of saturated signals. The advantage of the variable spectral modification as a function of level is that of allowing the user's ear to improve level perception, without having to use a frequency variation as a function of the level, thereby making it possible to reserve the possibility of using a frequency variation in line with discrimination information. Waveform reading makes it possible to generate varied sounds, and even, with a single oscillator, to simulate third or fifth chords by generating waveform tables the fundamental components of which are calibrated to the 4th, 5th and 6th harmonics of the signal.

In a second implementation, the spectral change within an area may be obtained by subtracting two waveforms the phase of which depends on the level of the detection signal at input of the device. This synthesis mode makes it possible to generate pulsed signals of variable widths (pulse width modulation or PWM) by subtracting two "sawtooth" signals (or SAW). It is thus possible to generate signals the spectral content of which varies radically depending on the phase offset value, from a virtually "flat" spectrum for low duty cycles, to a "square-wave" signal (spectrum with a 1/f decrease, without odd harmonics) for a duty cycle of 50% (see the spectra associated with the PWM signals above). One advantage of this type of synthesis is that it makes it possible to generate signals similar to PWM signals (with recognizable spectral shifts) while still having control of the overall richness of the spectrum by acting on the base signals (initially "sawtooth" signals) used for the subtraction.

In a third implementation, the spectral change within an area may be obtained through frequency modulations of the oscillator used to generate sound, using the methods developed by John Chowning in 1967.

In a fourth implementation, the spectral change within an area may be obtained through subtractive synthesis, for example by inserting, into the routing of the audio signal, a filter the characteristics of which are varied dynamically.

In a fifth implementation, the spectral changes may be obtained through additive synthesis, for example by implementing multiple audio oscillators the mixing of which may be determined as a function of the desired frequency spectrum.

All or some of the implementations given above by way of example may also be combined with one another so as to obtain spectral enrichment that is more complex in order to better address specific use cases.

22

The invention claimed is:

1. A method for generating an audio signal suitable for the acoustic rendering, to the user of a portable metal detection apparatus, using at least one electroacoustic transducer, of an electromagnetic target detection signal the amplitude of which may vary with a determined amplitude dynamic range, the method comprising the following steps:

reducing the amplitude dynamic range of the detection signal so that it corresponds to a desired dynamic range of the audio signal, said amplitude dynamic range applied to the detection signal being the difference between the lowest amplitude and the highest amplitude of said detection signal; and generating the audio signal on the basis of the detection signal with the reduced dynamic range, wherein:

reducing the dynamic range of the detection signal comprises:

clipping the detection signal on the basis of a determined detection threshold; said clipping the detection signal comprising clipping said detection signal below the detection threshold;

applying, to the clipped detection signal, an overall determined dynamic range compression rate, between 0 and 1, which depends on the ratio between the dynamic range of the detection signal and the desired dynamic range of the audio signal; and shifting the compressed detection signal so as to set a desired minimum level of the audio signal; and in that applying an overall dynamic range compression rate to the clipped detection signal comprises segmenting the dynamic range of the detection signal into a plurality of separate portions, and also applying respective local dynamic range modification rates to different portions of the clipped detection signal.

2. The method according to claim 1, wherein at least one local dynamic range modification rate is greater than or equal to unity.

3. The method according to claim 1, wherein the detection threshold and/or the value corresponding to the desired minimum level of the audio signal are programmable.

4. The method according to claim 1, wherein generating the audio signal comprises generating an acoustic signal having a fundamental component of a determined level, and modulating said acoustic signal with the compressed and shifted detection signal.

5. The method according to claim 1, wherein reducing the dynamic range of the received detection signal furthermore comprises, after clipping the detection signal but before applying the overall dynamic range compression rate to the clipped detection signal, half-wave rectification of said clipped detection signal.

6. The method according to claim 1, wherein some portions of the dynamic range of the detection signal are defined by linear segments.

7. The method according to claim 6, wherein generating the audio signal furthermore comprises changing the timbre of the acoustic signal between two respective portions of the dynamic range of the detection signal.

8. The method according to claim 7, wherein the change in timbre of the acoustic signal between two contiguous portions of the dynamic range of the detection signal is gradual from one to the other.

9. The method according to claim 1, further comprising, before the step of reducing the dynamic range of the detection signal, logarithmic conversion of said detection signal on a logarithmic scale, and wherein applying the overall dynamic range compression rate to the clipped detection signal or applying a local dynamic range modification rate to a determined portion of the clipped detection signal comprises multiplying said clipped detection signal or said clipped detection signal portion, respectively, by said overall dynamic range compression rate or by said local dynamic range modification rate, respectively.

10. The method according to claim 9, further comprising, after reducing the dynamic range of the detection signal and before generating the audio signal, inverse conversion of the logarithmic conversion of the received detection signal in order to return the dynamic range of the compressed and shifted detection signal to a linear scale.

11. The method according to claim 9, wherein said method further comprises:

shifting the compressed detection signal comprises adding a value corresponding to a desired minimum level of the audio signal.

12. A non-transitory computer-readable storage medium, comprising:

instructions for execution on a computer with a data processor, said data processor configured to generate an audio signal suitable for acoustic rendering, to a user of a portable metal detection apparatus, using at least one electroacoustic transducer, of an electromagnetic target detection signal the amplitude of which may vary with a determined amplitude dynamic range by:

reducing the amplitude dynamic range of the detection signal so that it corresponds to a desired dynamic range of the audio signal, said amplitude dynamic range applied to the detection signal being the difference between the lowest amplitude and the highest amplitude of said detection signal; and generating the audio signal on the basis of the detection signal with the reduced dynamic range, wherein:

reducing the dynamic range of the detection signal comprises:

clipping the detection signal on the basis of a determined detection threshold; said clipping the detection signal comprising clipping said detection signal below the detection threshold;

applying, to the clipped detection signal, an overall determined dynamic range compression rate, between 0 and 1, which depends on the ratio between the dynamic range of the detection signal and the desired dynamic range of the audio signal; and shifting the compressed detection signal so as to set a desired minimum level of the audio signal; and in that applying an overall dynamic range compression rate to the clipped detection signal comprises segmenting the dynamic range of the detection signal into a plurality of separate portions, and also applying respective local dynamic range modification rates to different portions of the clipped detection signal.

13. A portable metal detection apparatus comprising a non-transitory computer-readable storage medium, with instructions for execution on a computer with a data processor, said data processor configured to generate an audio signal suitable for acoustic rendering, to a user of a portable metal detection apparatus, using at least one electroacoustic transducer, of an electromagnetic target detection signal the amplitude of which may vary with a determined amplitude dynamic range by:

reducing the amplitude dynamic range of the detection signal so that it corresponds to a desired dynamic range of the audio signal, said amplitude dynamic range applied to the detection signal being the difference between the lowest amplitude and the highest amplitude of said detection signal; and generating the audio signal on the basis of the detection signal with the reduced dynamic range, wherein:

reducing the dynamic range of the detection signal comprises:

clipping the detection signal on the basis of a determined detection threshold; said clipping the detection signal comprising clipping said detection signal below the detection threshold;

applying, to the clipped detection signal, an overall determined dynamic range compression rate, between 0 and 1, which depends on the ratio between the dynamic range of the detection signal and the desired dynamic range of the audio signal; and shifting the compressed detection signal so as to set a desired minimum level of the audio signal; and in that applying an overall dynamic range compression rate to the clipped detection signal comprises segmenting the dynamic range of the detection signal into a plurality of separate portions, and also applying respective local dynamic range modification rates to different portions of the clipped detection signal.

* * * * *